Patented Sept. 26, 1950

2,524,011

UNITED STATES PATENT OFFICE 2,524,011

BETA-CHLOROPROPIONIC AND BETA-CHLOROISOBUTYRIC ACID NITRILES

John G. Erickson, Greenwich, Conn., assignor to American Cyanamid Company, New York, N. Y., a corporation of Maine No Drawing. Application October 2, 1948,
Serial No. 52,595

4 Claims. (Cl. 260—465.7)

The present invention relates to the preparation of beta-chloro-propionitrile and its alpha-alkyl derivatives.

It is an object of the present invention to add gaseous hydrogen chloride to acrylonitrile and its alpha-alkyl derivatives quickly and in excellent yields by means of a quaternary ammonium salt catalyst. Another object is to prepare beta-chloropropionitriles without the use of a cooling bath. Other objects will appear in the following description of the invention.

Stewart and Clark, Journal of the American Chemical Society, vol. 69, page 713 (1947), have demonstrated that hydrogen chloride may be added to acrylonitrile, folowed by distillation with an overall yield of 80% of recovered beta-chloro-propionitrile.

It has now been found that the overall yield of the beta-chloro derivative may be considerably increased and the reaction time considerably reduced if the addition is carried out in the presence of a quaternary ammonium salt. Both acrylonitrile and its alpha-alkyl derivatives absorb hydrogen chloride in greater amounts in the presence of such a catalyst at any given temperature, with a corresponding increase in overall yield.

The following examples illustrate the invention.

Example 1

Gaseous hydrogen chloride was bubbled into a well-stirred mixture of 2 moles of acrylonitrile and 0.0246 mole of benzyl trimethylammonium chloride. The temperature was held in the range of 27°–30° C. by means of a cooling bath and addition of hydrogen chloride was continued for about 3½ hours, during which time 62.8 grams of hydrogen chloride was absorbed by the mixture. The mixture was then distilled under reduced pressure to give an 84.6% yield of beta-chloropropionitrile. Under the same conditions, but omitting the catalyst, the yield was only 59.8%.

Example 2

Using the same conditions as in Example 1, except that the catalyst consisted of 0.0124 mole of benzyltrimethylammonium sulfate, a yield of 89.3% of beta-chloropropionitrile was obtained.

Example 3

Using conditions similar to those of Example 1, hydrogen chloride was added to methacrylonitrile at about 50°–53° C. in the presence of 0.0246 mole of tetramethylammonium chloride, and the yield of beta-chloroisobutyronitrile was 84.1%, compared with 64.3% when the reaction is conducted without a catalyst.

In addition to the acrylic compounds noted in the above examples, the following are representative of those that are suitable for use in the process of the present invention: methyl acrylate, ethyl acrylate, butyl acrylate, isobutyl acrylate, beta-methoxy ethyl acrylate, benzyl acrylate, phenethyl acrylate, phenyl acrylate, beta-naphthyl acrylate, 2-thienyl acrylate, alpha-chloroacrylonitrile, ethyl-alpha-chloroacrylate, ethacrylonitrile, ethyl ethacrylate, methyl ethacrylate.

In addition to the quaternary ammonium compounds listed in the preceding examples as catalysts, the following are also given as typical of the quaternary ammonium compounds that may be used in this process: cetylpyridinum chloride, cetylpyridinium bromide, tetraethyl ammonium chloride, methylpyridinium chloride, octadecyl trimethyl ammonium chloride, phenyl trimethyl ammonium chloride, and dodecyl triethyl ammonium bromide.

While the addition of hydrogen chloride may be made at any temperature at which the acrylonitrile is liquid, better yields are obtained at room temperature or higher. The preferred temperature range is about 27°–83° C. A considerable excess of hydrogen chloride may be used without substantially increasing the formation of by-products.

While the invention has been described with particular reference to specific embodiments, it is to be understood that it is not to be limited thereto but is to be construed broadly and restricted solely by the scope of the appended claims.

I claim:

1. The method comprising subjecting a member of the group consisting of acrylonitrile, its alpha-halogen derivatives, and its alpha-alkyl derivatives to the action of hydrogen chloride in the presence of a quaternary ammonium salt catalyst, whereby the corresponding beta-chloro derivative is formed, and recovering same.

2. The method comprising subjecting acrylonitrile to the action of hydrogen chloride in the presence of a quaternary salt catalyst to form beta-chloropropionitrile, and recovering same.

3. The method comprising subjecting methacrylonitrile to the action of hydrogen chloride in the presence of a quaternary ammonium salt catalyst to form beta-chlorobutyronitrile, and recovering same.

4. The method comprising passing hydrogen chloride into acrylonitrile in the presence of benzyltrimethylammonium sulfate catalyst at about 27°–30° C. to form beta-chloropropionitrile, and recovering same.

JOHN G. ERICKSON.

REFERENCES CITED

The following references are of record in the file of this patent:

UNITED STATES PATENTS

| Number | Name | Date |
|---|---|---|
| 1,851,040 | Fikentscher et al. | Mar. 29, 1932 |
| 2,434,606 | Carpenter | Jan. 13, 1948 |
| 2,440,801 | Hanford et al. | May 4, 1948 |

OTHER REFERENCES

Moureu et al., Bull. Soc. Chim. de France (4) vol. 27, pgs. 905–906 (1920).

Norris, "Organic Chemistry," (McGraw-Hill) pages 236–237 (1922).

Stewart et al., J. Am. Chem. Soc., vol. 69, pgs. 713–714 (1947).